June 24, 1958  E. M. LEE  2,840,158
CHAIN CLOSURE FOR OPENINGS
Filed May 26, 1954  3 Sheets-Sheet 1
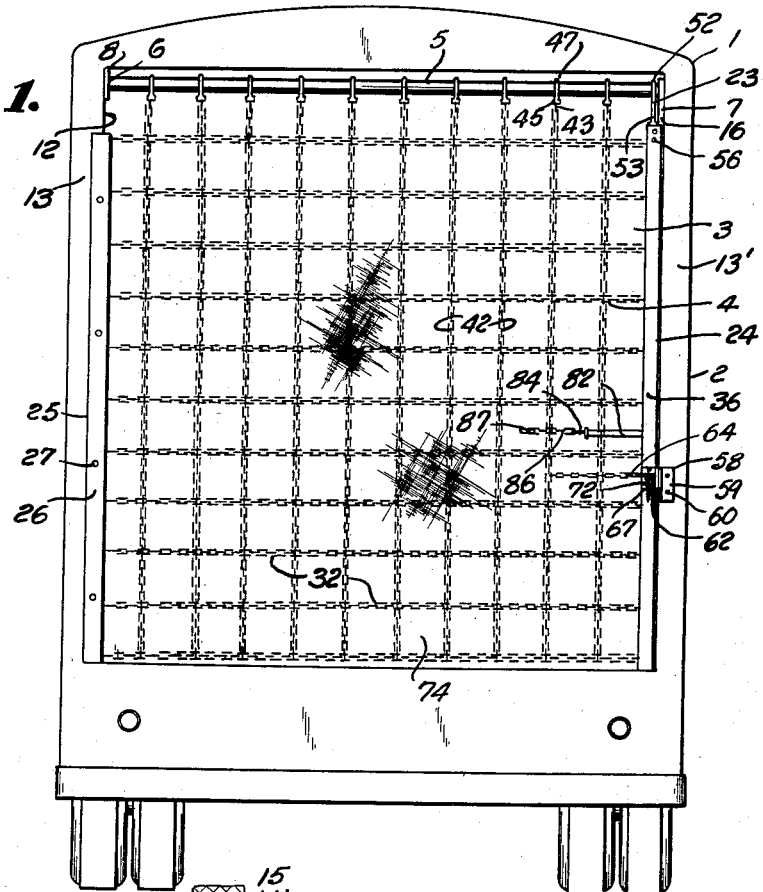
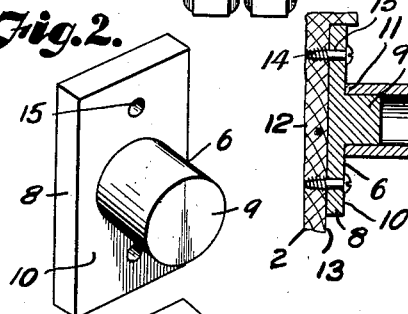
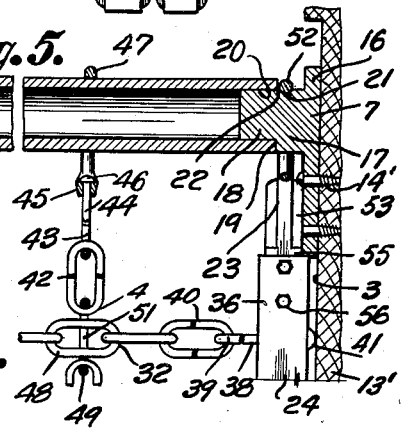
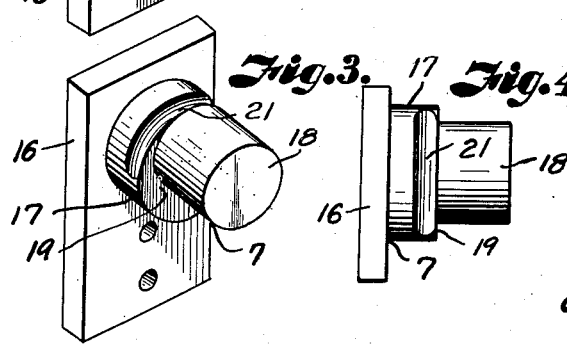
INVENTOR.
Earnest M. Lee.
BY
Fishburn & Mullendore
ATTORNEYS.

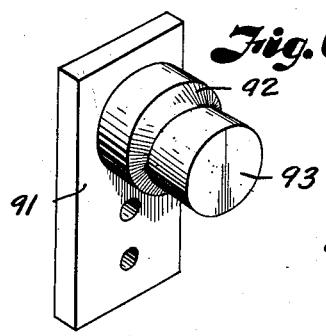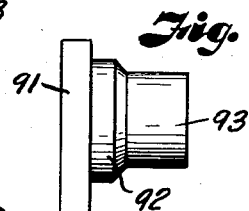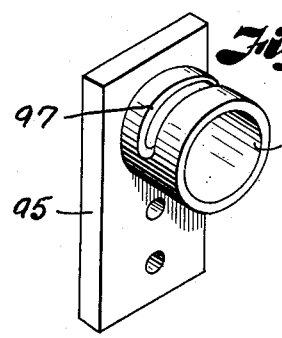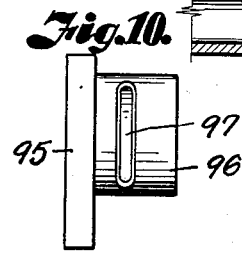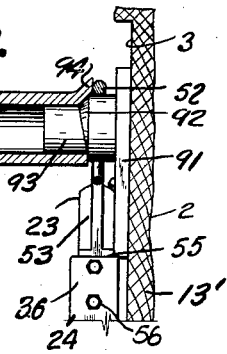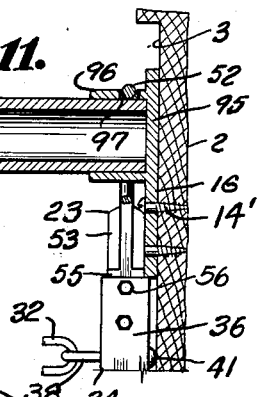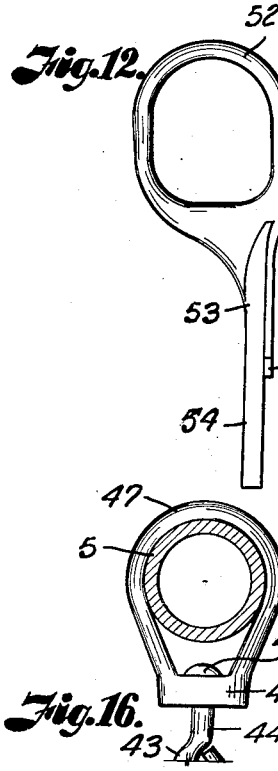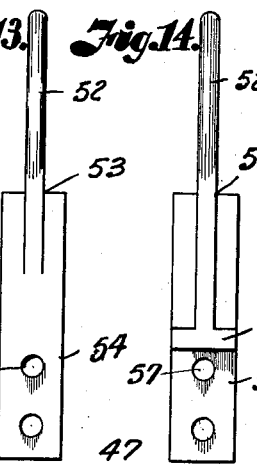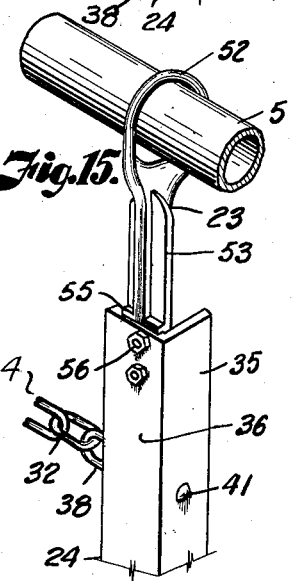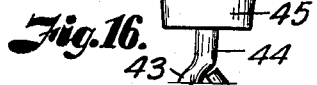
INVENTOR.
Earnest M. Lee.
ATTORNEYS.

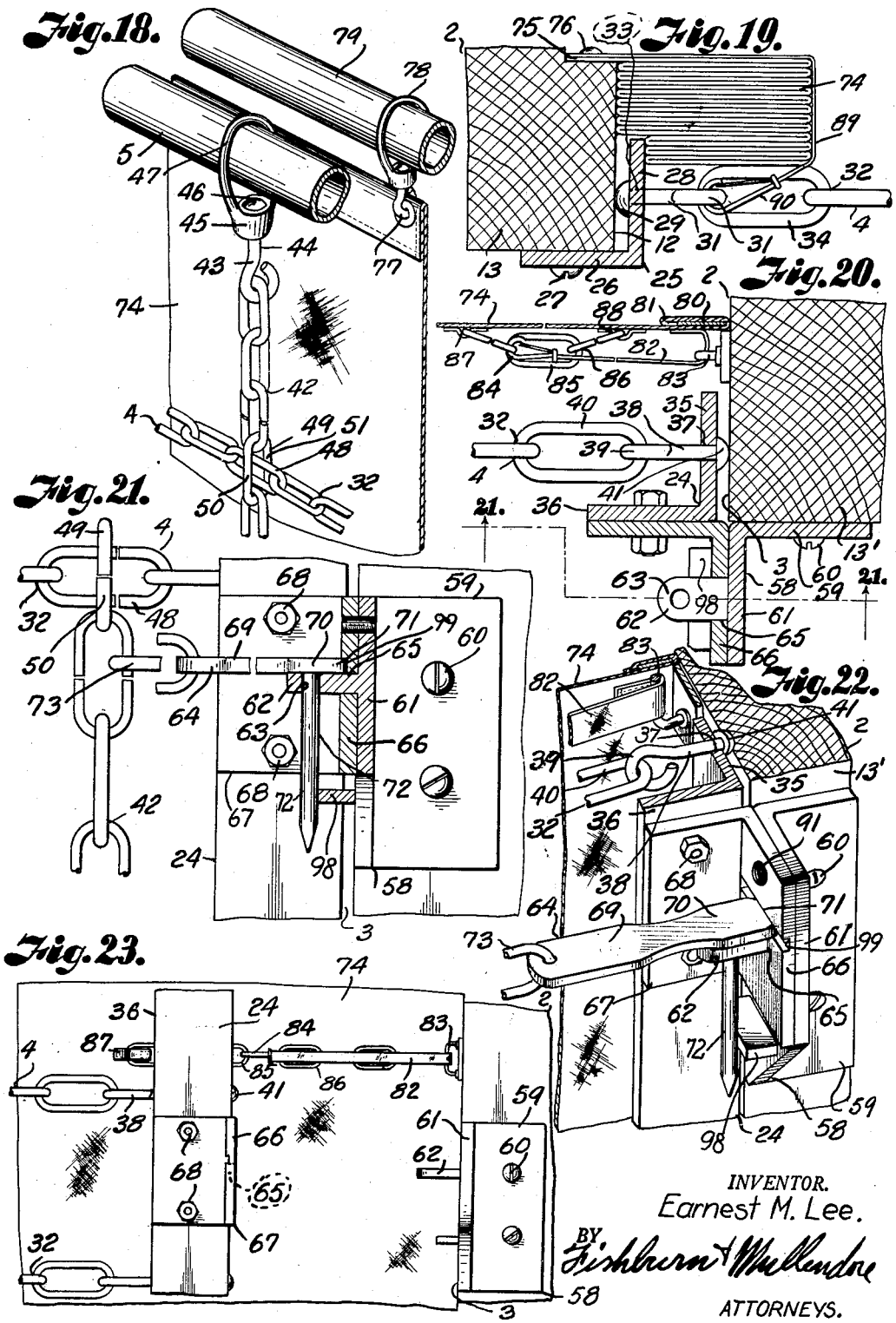

United States Patent Office 2,840,158
Patented June 24, 1958

2,840,158

CHAIN CLOSURE FOR OPENINGS

Earnest M. Lee, Mission Hills, Kans., assignor to Roll-O-Matic Chain Company, Kansas City, Mo., a corporation of Missouri Application May 26, 1954, Serial No. 432,411

2 Claims. (Cl. 160—327)

This invention relates to a chain closure for openings, for example the door openings of a motor truck used in hauling merchandise and the like.

It is necessary to provide such trucks with closures that protect the load from loss or theft. Such closures to be practical must be strong, light in weight, and be easily manipulated when moved from open to closed position, they also must not interfere with backing of the truck into close quarters or produce traffic hazards as in the case of wildly swinging doors. It is now becoming the practice to provide chain closures since they are of ample strength to protect the merchandise from loss or theft and may be opened and closed without taking into consideration the position of the truck relative to a loading dock, warehouse door or the like.

Heretofore chain closures have been bunglesome and difficult to get into a small compass. They have also been difficult to manipulate when stretching the chains over the door opening and particularly without placing part of the closure under bending stresses.

The principal objects of the present invention are therefore to provide a strong, light-weight chain closure that is easily manipulated and tightened in closed position and which may be gathered into a small compact mass at the side of the door opening when loading and unloading the truck.

Other objects of the invention are to provide a chain closure consisting of vertical and horizontal chains with the vertical chains slidably suspended from a guide rod and with the ends of the horizontal chains connected with end members to facilitate tensioning thereof; to provide swivel connections for the ends of the respective chains; to provide the chain closure with a tensioning bar and locking means therefor of simple and strong construction; to provide a fulcrum support of the tensioning bar in such a manner that the suspended end thereof is automatically retained in fixed position on the supporting bar and cooperates with the tensioning and locking means in tightening the chains without bending; and to provide a chain closure that is substantially more flexible, free from tangling and easier to manipulate.

Another object is to provide the means to prevent binding of the locking pin and to prevent the locking pin from working out when it is in place.

It is also an object of the invention to provide a fabric curtain in combination with the chain closure for excluding the elements in times of bad weather.

In accomplishing these and other objects of the invention, hereinafter pointed out, I have provided improved structure the preferred forms of which are illustrated in the accompanying drawings wherein:

Fig. 1 is a perspective view of a rear end of a motor truck equipped with a chain closure constructed in accordance with the present invention.

Fig. 2 is a perspective view of the bracket for one end of the chain supporting rod.

Fig. 3 is a similar view of the bracket which supports the opposite end of the rod.

Fig. 4 is a plan view of the bracket illustrated in Fig. 3.

Fig. 5 is a detailed sectional view of the mount of the chain supporting rod, the upper portion of the chain tensioning bar, and connection of one of the vertical and horizontal chains.

Fig. 6 shows a modified form of a bracket illustrated in Figs. 3 and 4.

Fig. 7 is a plan view of the bracket illustrated in Fig. 6.

Fig. 8 is a fragmentary section showing the bracket of Figs. 6 and 7 in position for mounting the chain supporting rod and suspension of the tensioning bar.

Fig. 9 is a perspective view of a further modified bracket.

Fig. 10 is a plan view of the bracket illustrated in Fig. 9.

Fig. 11 is a perspective view showing the installation of the bracket illustrated in Figs. 9 and 10.

Fig. 12 is a side elevational view of the hanger for supporting the tensioning bar.

Fig. 13 is a side elevational view of the tensioning bar hanger.

Fig. 14 is an elevational view of the opposite side of the hanger.

Fig. 15 is a fragmentary perspective view showing support of the tensioning bar.

Fig. 16 is an enlarged cross section through the chain suspending rod showing one of the swivel rings mounted thereon for attaching the vertical chain of the closure.

Fig. 17 is a side elevational view of the parts illustrated in Fig. 16.

Fig. 18 is a fragmentary view of portions of the supporting bar with portions of the chain closure and the curtain used in conjunction therewith.

Fig. 19 is a cross section through one side of the truck opening showing the curtain in collapsed position at the side of the truck opening and illustrates one of the swivel mounts at the fixed side of the chain closure.

Fig. 20 is a section through the opposite side of the door opening particularly illustrating parts of the fasteners for the curtain and tensioning bar.

Fig. 21 is a section on a line 21—21 of Fig. 20 but with the tightening lever in place.

Fig. 22 is a perspective view of the parts illustrated in Figs. 20 and 21.

Fig. 23 is a fragmentary elevational view showing the curtain in closed position and the tensioning bar being moved into a position for engagement with the lock bracket on the side of the door opening.

Referring more in detail to the drawings:

1 designates a motor truck including an enclosed body 2 having a rear door opening 3 through which the truck is loaded and unloaded and which is adapted to be closed by a chain closure 4 constructed in accordance with the present invention.

The chain closure 4 includes a transverse rod 5 which may be formed of pipe or other tubular material as shown in Fig. 5. The rod 5 is of suitable length to cooperate with supporting brackets 6 and 7 to span width of opening 3. The bracket 6 has a plate portion 8 and a cylindrical boss 9 projecting from the face 10 of the plate portion 8 to engage within the open end 11 of the rod 5 (Fig. 5). The plate portion 8 of the bracket is illustrated in the drawing attached to the inner face 12 of the side jamb 13 of the door opening by means of fastening devices such as screws 14 which extend through openings 15 in the plate portion of the bracket end into the jamb 13.

The bracket 7 also includes a plate portion 16 having a cylindrical boss 17 projecting from the face thereof and which terminates in an extension 18 of smaller diameter and with its axis offset upwardly of the axis of the boss to provide a shoulder 19. The portion 18 seats snugly within the open end 20 of the rod 5 whereby the end 20 of the rod abuts against the shoulder 19 as best shown in Fig. 3. The bracket 7 is affixed to the opposite side jamb 13' by fastening devices 14' similar to the bracket 6. The peripherical portion of the boss 17 is provided with a transverse groove 21 that cooperates with the end of the rod 5 to provide a fulcrum or seat 22 for a hanger 23 which suspendingly supports the upper end of a movable chain tensioning bar 24 later to be described.

Fixed vertically along the jamb 13 is a bar 25, preferably an angle having one flange 26 fixed to the outer face of the jamb by fastening devices such as screws 27 to support the other flange 28 of the angle inwardly of the opening and in spaced relation of the inner face 12 of the jamb 13 to allow room for heads 29 on the shanks 30 of hooks 31 (Fig. 19). The shanks 30 of the hooks swivel within openings 33 in the inwardly extending flange 28 of the angle bar 25 as shown in Fig. 19. The swivel hooks 31 are arranged in spaced relation along the height of the bar 25 in accordance with the desired spacing of horizontally transverse chains 32 for swivelly anchoring the end most links 34 of the respective chains 32. The opposite ends of the horizontal chains 32 are secured to the tensioning bar 24. The bar 24 may also comprise an angle having an inwardly extending flange 35 (Fig. 20) and a flange 36 positioned in the plane of the door opening. The flange 35 has openings 37 spaced along the height thereof in accordance with the spacing of the openings 32 in the angle bar 25 to mount swivelly the shanks 38 of swivel hooks 39 to which the links 40 on the free end of the transverse chains are connected. The hooks 39 have heads 41 as shown in Figs. 20 and 21.

The closure 4 also includes vertical chains 42 which have their upper ends suspending from the rod 5 by means of hooks 43 having shanks 44 that are swivelly retained within collars 45 by providing the shanks with heads 46 similar to the heads on the swivel hooks previously described. Each collar 45 is provided in the lower portion of an integrally formed bail or ring 47 that slides upon the rod 5 when the chain closure is moved to and from closed position as later described. The horizontal transverse chains have links 48 which are loosely retained within links 49 of the vertical chains, this is effected by spreading the side bars 50 and 51 of the links 49 so that the links 48 of the horizontal chains will pass freely therebetween. When the depending vertical chains are in proper spaced relation relative to the horizontal chains after which the bars 50 and 51 are closed together as shown in Fig. 18 to retain the links 48 of the horizontally transverse chains therebetween. It is obvious that with this connection between vertical and the horizontal chains the closure is relatively flexible to allow free movement of the chains when the vertical chains are moved along the rod 5 to and from open and closed position, and that when open the depending chains will hang in a small compact mass at the side of the jamb 13 with the transverse chains hanging in loops therebetween. The movable or tensioning bar 24 like the chains is slidably suspended on the rod 5 by means of the hanger 23 illustrated in Figs. 12, 13 and 14. The hanger 23 includes a loop or ring portion 52 of ample size to pass over the rod 5 as shown in Figs. 5, 8, 11 and 15. Depending from the loop portion or ring 52 in off-center relation with respect thereto, is a shank 53 terminating in a flat strap 54 which is attached to upper end of the inwardly extending flange 26 of the tension bar 24 as shown in Fig. 15 with the end of the flange abutting against a transverse rib 55 on the strap. The strap is secured to the flange of the tension bar by fastening devices such as bolts 56 extending through openings 57 and corresponding openings in the flange as will be understood upon inspection of Fig. 15. The loop or ring portion of the hanger is preferably of circular cross section to seat within the transverse groove 21 of the bracket 7 when the tensioning bar rides off the end of the rod to bear therein and against the end of the rod when the lower end of the tensioning bar is moved into position for clamped engagement with a bracket 58. The bracket 58 is attached to the side jamb 13' of the truck body in convenient position to be manipulated either from the ground or from the floor of the truck. The lock bracket 58 is best illustrated in Figs. 20 to 23 inclusive and includes an attaching plate portion 59 that is secured to the jamb 13' by fastening devices such as screws 60 that extend through openings in the flange portion of the bracket and thread into the jamb. The lock bracket also includes a laterally extending flange portion 61 which carries an ear 62 that projects therefrom and which is provided with an opening 63 extending therethrough for accommodating lock lever 64 later described. The ear 62 is of rectangular cross section and positioned with the width thereof horizontally to pass through a rectangular slot 65 that is provided within an outwardly extending plate portion 66 of a bracket 67 which is attached to the flange 36 of the tensioning bar 24, the bracket being secured by fastening devices such as bolts 68 as shown in Fig. 20.

The locking lever 64 includes a handle portion 69 having a head 70 provided with a cam-shaped end 71 for engaging the inner face of the plate portion 61 of the bracket 58 and to draw the locking bracket together when a pin 72 that projects from the head 70 is passed through the opening 63 in the ear 62. When the handle portion is pivoted on the axis of the pin 72 the cam face 71 is brought into camming relation with the locking bracket 58.

In order to prevent loss of the locking lever 64 it is attached by a captive chain 73 to one of the chains of the closure, for example, one of the vertical chains as shown in Fig. 1.

Since the closure is composed of chains it is desirable to provide a curtain 74 that may be used in times of bad weather for closing the opening 3 to the elements. The curtain 74 may be formed of any suitable fabric such as water-proof canvas and of a size to close the opening. One side edge 75 is secured to the side jamb 13 of the door frame as indicated at 76 in Fig. 19. The upper portion of the curtain is carried by swivel hooks 77 carried by rings 78 similar to the chains suspension rings previously described (Fig. 18). The curtain rings 78 are mounted for sliding movement on a rod 79 which has its ends supported by brackets similar to the brackets illustrated in Fig. 2. The free edge of the curtain carries a stiffening bar 80 that is contained within a hem 81 formed within the side edge of the curtain. The curtain is drawn across the opening 3 and is retained in taut condition by means of a strap 82 that extends through a loop 83 attached to the side jamb 13' as shown in Fig. 20. The end of the strap is provided with a snap or the like 84 that is adapted to be connected to any one of a series of links 85 of a chain 86 having its ends secured to outer face of the curtain by loops 87 and 88 shown in Fig. 20. With this adjustable fastening the curtain may be kept in taut condition regardless of any change in size caused by atmospheric conditions. The curtain may hang in folds at the opposite side of the door when not in use as shown in Fig. 19, the curtain being held back by a strap 89 which is attached at one end to the jamb 13 for extension around the folds of the curtain and is secured to one of the hooks 31 or one of the links of the horizontal chains by means of a snap 90.

The modified form of bracket illustrated in Figs. 6, 7 and 8, like the bracket 7, has a plate portion 91 adapted to be attached to the inner face of the side jamb 13. Projecting from the plate 91 is a boss 92 having a cylindrical extension 93 which is adapted to engage within the open end of the tubular rod 5, in this instance the end of the tubular rod is shaped to provide a stop or fulcrum 94 for engaging the ring 52 of the hanger.

The form of bracket illustrated in Figs. 9, 10 and 11 also includes a plate 95 that is adapted to be fixed to the inner face of the jamb 13 in a manner similar to the other brackets, however, the plate portion 95 carries a laterally extending cylindrical socket 96 in which the end of the rod 5 is fitted. In this instance the socket 96 has a groove or slot 97 in the upper portion thereof to provide the stop with which the ring 52 of the hanger is engaged as shown in Fig. 11.

Assuming that the chain closure and curtain are constructed and installed as described, the curtain 74 would probably be kept in folded position with the folds gathered together and retained by the strap 89.

When the chain closure is in open position all of the slides or rings 47 are moved along the transverse rod 5 so that the vertical chains 42 gather alongside the bar 25 with the portions of the transverse chains hanging from the links 49 through which they are threaded, in this position the chain closure provides a maximum opening for the rear of the truck.

When the chain closure is to be moved across the opening, the movable or tensioning bar is pulled along the transverse rod 5 with the horizontal chains pulling the vertically depending chains into spaced relation along the length of the transverse rod as shown in Fig. 1, until the ring 52 of the hanger 23 drops off the end of the rod and engages within the seat 21. The lower end of the bar is then swung into position alongside the jamb 13' so that the ear 62 passes through the opening 65. The pin 72 of the locking lever 64 is then inserted in the aperture 63 of the ear 62 with the handle extending substantially parallel with the flange 66. The handle of the lever is then swung inwardly so that the face 71 of the cam head 70 moves against the flange 66 and pushes the flange into engagement with the flange 61. It is thus obvious that the lever 64 cooperates with the seat 22 of the hanger to tension the chains and retain the chain closure in closing relation with the opening.

If the curtain is to be used, the snap 90 is released and the curtain is pulled along the transverse rod 79 until the free edge reaches the opposite side of the opening. The strap 82 may then be passed through the loop 83 and the snap 84 thereof secured to one of the links 85 of the chain 86.

If desired, the flanges 61 and 66 may be provided with registering openings 91 to secure a padlock or the like, not shown.

In order to prevent binding of the lock pin 72 within the opening 63, the lower portion of the flange 61 is provided with a lug 98 against which the side of the pin may bear, as shown in Fig. 22. It may also be desirable to provide means for preventing the pin from working out of position and this may be effected by providing the plate portion 66 with a groove 99 within which the cam portion of the lock lever 64 is adapted to engage when the locking lever tightens the chains of the closure as shown in Figs. 21 and 22.

It is obvious that with the construction described, the transverse chains 32 have the links 48 crossing through the links 49 in the depending chains 42, and that the crossing links 48 and 49 are freely contained one within the other. It is also apparent that the swivel connections are all adapted to turn to prevent twisting of the chains 32 and 42 and keep the contained links 48 in right angular planes with respect to the planes of the links 49 in which they are contained to maintain free positioning of the links while the chains are tensioned between the side jambs of the opening on which the chain closure is used.

From the foregoing it is obvious that I have provided a chain closure that is substantially flexible to facilitate operation thereof and permit collapse thereof to a relatively small size when the closure is moved to retracted position.

What I claim and desire to secure by Letters Patent is:

1. A chain closure for an opening provided between laterally spaced apart side jambs having facing sides, said chain closure including a stationary angle bar having one flange in a plane parallel with the said facing side of one of the jambs, said flange being provided with apertures spaced apart along the height of the stationary angle bar, means for attaching the stationary angle bar to said side jamb, a transverse rod adapted to extend across the upper portion of said opening, means for securing ends of the transverse rod to the facing sides of said side jambs, rings slidable loosely along said transverse rod and having collars on under sides thereof, swivels having shanks rotatably retained in said collars, a movable angle bar having a flange positioned similarly to the apertured flange of the stationary angle bar and provided with apertures in horizontally aligning registry with the apertures in said flange of the stationary angle bar, a bracket on the upper end of the movable angle bar and having a ring slidable on the transverse rod for suspending the movable angle bar, chains depending from said swivels and having links in horizontally aligning registry with the apertures in the flanges of said angle bars, swivels having shanks rotatable in said apertures of the flanges of the stationary and movable angle bars, transverse chains having end links connected with the last named swivels and having links crossing said registering links, said crossing links of the depending and transverse chains being contained freely one within the other, said movable angle bar being movable along the transverse rod from a position with the depending chains gathered at the side of the stationary angle bar with the transverse chains hanging in loops between said crossing links to a position at the opposite side of the opening to extend the transverse chains tautly across the opening between said jambs, and means for releasably securing the movable angle bar to said side jamb at the side of the opening opposite the stationary angle bar, said shanks of the swivels being adapted to turn within said collars of the rings and within the apertures of the flanges of the stationary and movable angle bars to keep the contained links in right angular planes with respect to the planes of the links in which they are contained to maintain free positioning of the links while the chains are tensioned between the side jambs of said opening.

2. A chain closure for an opening provided between laterally spaced apart side jambs having facing sides, said chain closure including a stationary angle bar having one flange in a plane parallel with the said facing side of one of the jambs, said flange being provided with apertures spaced apart along the height of the stationary angle bar, means for attaching the stationary angle bar to said side jamb, a transverse rod adapted to extend across the upper portion of said opening, means for securing ends of the transverse rod to the facing sides of said side jambs, rings slidable loosely along said transverse rod, a movable angle bar having a flange positioned similarly to the apertured flange of the stationary angle bar and provided with apertures in horizontally aligned registry with the apertures in said flange of the stationary angle bar, a bracket on the upper end of the movable angle bar and having a ring slidable on the transverse rod for suspending the movable angle bar, chains depending from said loosely slidable rings and having links in horizontally aligning registry with the apertures in the flanges of said stationary and movable angle bars, swivels having shanks rotatable in said apertures of the flanges of the stationary and movable angle bars, transverse chains having end links connected with said swivels and having links crossing said registering links, said crossing links of the depending and transverse chains being contained freely one within the other, said movable angle bar being movable along the transverse rod from a position with the depending chains gathered at the side of the stationary angle bar with the transverse chains hanging in loops between said crossing links to a position at the opposite side of the opening to extend the transverse chains tautly across the opening between said jambs, and means for releasably securing the movable angle bar to said side jamb at the side of the opening opposite the stationary angle bar, said shanks of the swivels being adapted to turn within the apertures of the flanges of the stationary and movable angle bars to keep the contained links in right angular planes with respect to the planes of the links in which they are contained to retain free positioning of the links while the chains are tensioned between the side jambs of said opening.

References Cited in the file of this patent

UNITED STATES PATENTS

| | | |
|---|---|---|
| 566,815 | Taylor | Sept. 1, 1896 |
| 1,016,479 | Coyne | Feb. 6, 1912 |
| 1,167,554 | Goelz | Jan. 11, 1916 |
| 1,667,520 | Henry | Apr. 24, 1928 |
| 1,727,487 | Seiker | Sept. 10, 1929 |
| 2,088,072 | Tobin | July 27, 1937 |
| 2,136,042 | Cornell et al. | Nov. 8, 1938 |
| 2,188,163 | Sherman | Jan. 23, 1940 |
| 2,596,850 | Griffin | May 13, 1952 |
| 2,612,221 | Dellapent | Sept. 30, 1952 |
| 2,678,690 | Rust et al. | May 18, 1954 |